(12) United States Patent
Nishijima

(10) Patent No.: US 12,544,023 B2
(45) Date of Patent: Feb. 10, 2026

(54) X-RAY CT APPARATUS, X-RAY DETECTOR, AND CONTROL METHOD

(71) Applicant: CANON MEDICAL SYSTEMS CORPORATION, Tochigi (JP)

(72) Inventor: Akira Nishijima, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 165 days.

(21) Appl. No.: 18/596,215

(22) Filed: Mar. 5, 2024

(65) Prior Publication Data

US 2024/0298983 A1  Sep. 12, 2024

(30) Foreign Application Priority Data

Mar. 6, 2023 (JP) .................. 2023-033783

(51) Int. Cl.
  *A61B 6/42* (2024.01)
  *A61B 6/00* (2006.01)
  *A61B 6/03* (2006.01)

(52) U.S. Cl.
  CPC ............ *A61B 6/4241* (2013.01); *A61B 6/035* (2013.01); *A61B 6/54* (2013.01)

(58) Field of Classification Search
  CPC ... G01T 1/24; G01T 1/20185; G01T 1/20183; G01T 1/2971; G01T 1/241; G01T 1/208; A61B 6/032; A61B 6/5205; A61B 6/4233; A61B 6/4241; A61B 6/405; A61B 6/035; A61B 6/54
  See application file for complete search history.

(56) References Cited

U.S. PATENT DOCUMENTS

| 5,729,584 A * | 3/1998 | Moorman ........... G01T 1/20182 378/146 |
| 10,884,143 B2 | 1/2021 | Onouchi |
| 11,896,410 B2 | 2/2024 | Kojima |

(Continued)

FOREIGN PATENT DOCUMENTS

| JP | 2013-168846 A | 8/2013 |
| JP | 2018-143575 A | 9/2018 |

(Continued)

OTHER PUBLICATIONS

Extended European Search Report issued Jul. 12, 2024 in European Patent Application No. 24161712.5, citing documents 1-3 and 15 therein, 15 pages.

*Primary Examiner* — Don K Wong
(74) *Attorney, Agent, or Firm* — Oblon, McClelland, Maier & Neustadt, L.L.P.

(57) ABSTRACT

An X-ray CT apparatus according to an embodiment includes: an X-ray detector of photon counting type including a plurality of detection elements and a voltage supply device configured to supply the detection elements with a voltage for reading out electric charges accumulated in the detection elements irradiated with X-rays; and processing circuitry configured to identify a target element from among the detection elements based on information acquired in advance, the target element causing a large current to flow through a circuit between the target element and the voltage supply device and compensate for a change of the voltage supplied from the voltage supply device to the target element.

12 Claims, 5 Drawing Sheets

(56) References Cited

U.S. PATENT DOCUMENTS

| | | |
|---|---|---|
| 2013/0148782 A1 | 6/2013 | Tajima |
| 2013/0343517 A1 | 12/2013 | Gagnon et al. |
| 2014/0205066 A1 | 7/2014 | Kitagawa et al. |
| 2019/0383954 A1 | 12/2019 | Onouchi |
| 2021/0251594 A1 | 8/2021 | Kato et al. |
| 2022/0211338 A1 | 7/2022 | Kojima |

FOREIGN PATENT DOCUMENTS

| | | |
|---|---|---|
| JP | 2021-129710 A | 9/2021 |
| JP | 2022-106241 A | 7/2022 |

\* cited by examiner

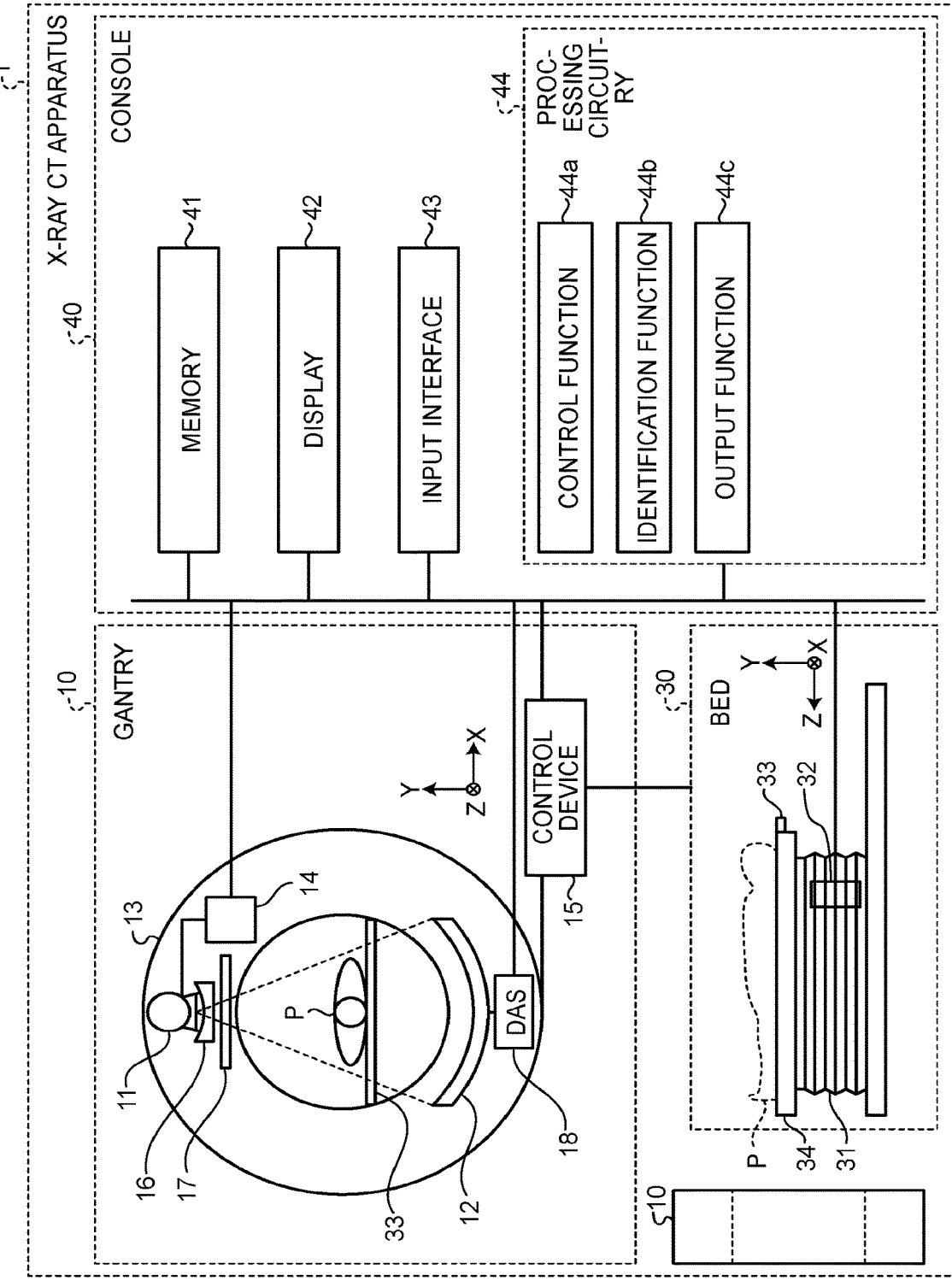

X-RAY CT APPARATUS, X-RAY DETECTOR, AND CONTROL METHOD

CROSS-REFERENCE TO RELATED APPLICATIONS

This application is based upon and claims the benefit of priority from Japanese Patent Application No. 2023-033783, filed on Mar. 6, 2023; the entire contents of which are incorporated herein by reference.

FIELD

Embodiments described herein relate generally to an X-ray CT apparatus, an X-ray detector, and a control method.

BACKGROUND

There is known an X-ray CT apparatus using a photon counting type (photon counting type) X-ray detector. In a CT scan using the photon counting type X-ray detector, incident X-ray photons are counted for every optional number of energy bands (bins). Due to this, an X-ray CT image can be reconstructed, and substance discrimination processing can be performed for every optional number of substances. Furthermore, circuit noise can be theoretically suppressed, so that image quality can be maintained even in a case of performing a CT scan with a low dose.

The photon counting type X-ray detector is implemented by a semiconductor detector, for example. Specifically, X-ray detection signals can be acquired by applying a voltage to electric charges generated in the semiconductor detector due to incidence of X-rays to be output.

BRIEF DESCRIPTION OF THE DRAWINGS

FIG. 1A is a block diagram illustrating an example of a configuration of an X-ray CT apparatus according to an embodiment;

DETAILED DESCRIPTION

Figure 1B:
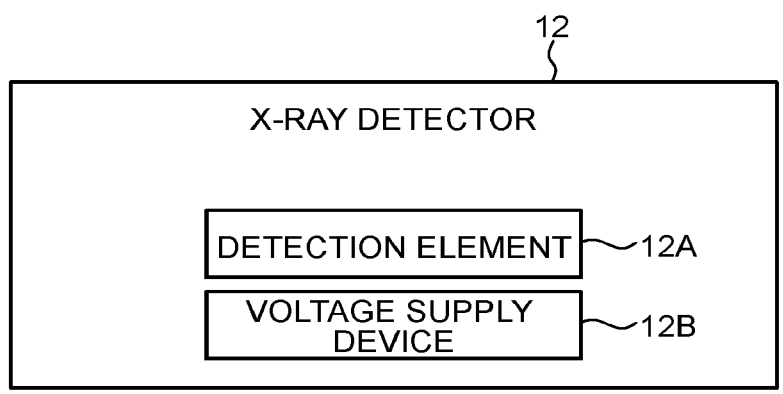
FIG. 1B is a block diagram illustrating an example of a configuration of an X-ray detector according to the embodiment.

The following describes an embodiment of an X-ray CT apparatus, an X-ray detector, and a control method in detail with reference to the attached drawings.

In the present embodiment, an X-ray CT apparatus 1 illustrated in FIG. 1A is exemplified. FIG. 1A is a block diagram illustrating an example of a configuration of the X-ray CT apparatus 1 according to the embodiment. For example, the X-ray CT apparatus 1 includes a gantry 10, a bed 30, and a console 40.

In FIG. 1A, the Z-axis direction is assumed to be a rotation axis of a rotary frame 13 in a non-tilted state or a longitudinal direction of a tabletop 33 of the bed 30. Additionally, the X-axis direction is assumed to be an axial direction that is orthogonal to the Z-axis direction and horizontal with respect to a floor surface. The Y-axis direction is assumed to be an axial direction that is orthogonal to the Z-axis direction and perpendicular to the floor surface. FIG. 1A depicts the gantry 10 from a plurality of directions for explanation, and illustrates a case in which the X-ray CT apparatus 1 includes the one gantry 10.

The gantry 10 includes an X-ray tube 11, an X-ray detector 12, the rotary frame 13, an X-ray high voltage device 14, a control device 15, a wedge 16, a collimator 17, and a data acquisition system (DAS) 18.

The X-ray tube 11 is a vacuum tube including a cathode (filament) that generates thermoelectrons and an anode (target) that generates X-rays when the thermoelectrons collide therewith. The X-ray tube 11 generates X-rays to be applied to a subject P by applying thermoelectrons from the cathode toward the anode when a high voltage is applied from the X-ray high voltage device 14.

The X-ray detector 12 includes a plurality of detection elements (pixels), detects X-rays that have been emitted from the X-ray tube 11 and passed through the subject P, and outputs a detection signal corresponding to a detected X-ray dose to the DAS 18. Herein, the X-ray detector 12 is an example of a photon counting type (photon counting type) X-ray detector. For example, the X-ray detector 12 is a detector of direct conversion type that directly converts incident X-ray photons into electric signals. As a detector of direct detection type, for example, a semiconductor diode in which electrodes are attached to both ends of a semiconductor detector can be applied.

An X-ray photon incident on the semiconductor detector is converted into an electron-hole pair. The number of the electron-hole pairs generated by incidence of one X-ray photon depends on energy of the incident X-ray photon. The electron and the hole are respectively attracted to the pair of electrodes formed at both ends of the semiconductor detector, and the pair of electrodes generates an electric signal having a peak value corresponding to an electric charge of the electron-hole pair. One electric signal has a peak value corresponding to the energy of the incident X-ray photon.

The rotary frame 13 is a frame having an annular shape that supports the X-ray tube 11 and the X-ray detector 12 to be opposed to each other, and rotates the X-ray tube 11 and the X-ray detector 12 by the control device 15. For example, the rotary frame 13 is a casting made of aluminum as a material. The rotary frame 13 can further support the X-ray high voltage device 14, the wedge 16, the collimator 17, the DAS 18, and the like in addition to the X-ray tube 11 and the X-ray detector 12. In the following description, in the gantry 10, the rotary frame 13 and a portion that rotates and moves together with the rotary frame 13 are also referred to as rotation part (rotor). A portion that does not rotate in the gantry 10 is also referred to as fixed part (stator). The fixed part supports the rotation part.

The control device 15 performs operation control for the gantry 10 and the bed 30. The wedge 16 is an X-ray filter for adjusting a dose of X-rays emitted from the X-ray tube 11. The collimator 17 is an X-ray diaphragm for narrowing down an irradiation range of X-rays transmitted through the wedge 16. A narrowing range of the collimator 17 can be mechanically driven.

The DAS 18 acquires signals of X-rays detected by the respective detection elements included in the X-ray detector 12. For example, the DAS 18 includes an amplifier that performs amplification processing on the electric signal output from each detection element and an A/D converter that converts the electric signal into a digital signal, and generates detection data.

The data generated by the DAS 18 is transmitted to a receiver including a photodiode disposed on a non-rotary portion (for example, a fixed frame and the like. Not illustrated in FIG. 1A) of the gantry 10 by optical communication from a transmitter including a light emitting diode (LED) disposed on the rotary frame 13, and transferred to the console 40. Herein, the non-rotary portion is, for example, a fixed frame or the like that supports the rotary frame 13 in a rotatable manner. A method for transmitting data from the rotary frame 13 to the non-rotary portion of the gantry 10 is not limited to the optical communication. Any data transmission scheme of non-contact type may be employed, or a data transmission scheme of contact type may be employed. The X-ray detector 12 and the DAS 18 may be formed as an integrated detector unit DU.

The bed 30 is an apparatus for placing and moving the subject P as a target of a CT scan, and includes a base 31, a bed drive device 32, the tabletop 33, and a support frame 34. The base 31 is a housing that supports the support frame 34 to be movable in a vertical direction. The bed drive device 32 is a driving mechanism that moves the tabletop 33 on which the subject P is placed in a long axis direction of the tabletop 33, and includes a motor, an actuator, and the like. The tabletop 33 disposed on an upper surface of the support frame 34 is a plate on which the subject P is placed. The bed drive device 32 may move the support frame 34 in the long axis direction of the tabletop 33 in addition to the tabletop 33.

The console 40 includes a memory 41, a display 42, an input interface 43, and processing circuitry 44. In the following description, the console 40 is separated from the gantry 10, but the gantry 10 may include the console 40 or some of constituent elements of the console 40.

The memory 41 is, for example, implemented by a semiconductor memory element such as a random access memory (RAM) and a flash memory, a hard disk, an optical disc, and the like. For example, the memory 41 stores projection data acquired by the CT scan, and an X-ray CT image reconstructed based on the projection data. The memory 41 also stores a computer program for a circuit included in the X-ray CT apparatus 1 to implement a function thereof. The memory 41 may also be implemented by a server group (cloud) connected to the X-ray CT apparatus 1 via a network.

The display 42 displays various pieces of information under control by the processing circuitry 44. For example, the display 42 displays a graphical user interface (GUI) for receiving various instructions, settings, and the like from a user via the input interface 43. The display 42 also displays an image for display that is generated based on the X-ray CT image. For example, the display 42 is a liquid crystal display or a cathode ray tube (CRT) display. The display 42 may be a desktop type, or may be configured by a tablet terminal and the like that can wirelessly communicate with the processing circuitry 44.

The input interface 43 receives various input operations from the user, and converts the input operations into electric signals to be output to the processing circuitry 44. For example, the input interface 43 is implemented by a mouse or a keyboard, a trackball, a switch, a button, a joystick, a touch pad on which an input operation is performed by touching an operation surface, a touch screen obtained by integrating a display screen with a touch pad, a noncontact input circuit using an optical sensor, a voice input circuit, and the like. The input interface 43 may be configured by a tablet terminal and the like that can wirelessly communicate with the processing circuitry 44. The input interface 43 may be a circuit that receives an input operation from the user by motion capture. By way of example, the input interface 43 can receive body motion, a line of sight, and the like of the user as input operations by processing a signal acquired via a tracker or an image acquired for the user. The input interface 43 does not necessarily include a physical operation component such as a mouse or a keyboard. For example, examples of the input interface 43 include a processing circuit for an electric signal that receives an electric signal corresponding to an input operation from an external input appliance that is disposed separately from the X-ray CT apparatus 1, and outputs the electric signal to the processing circuitry 44.

The processing circuitry 44 controls the entire operation of the X-ray CT apparatus 1 by executing a control function 44a, an identification function 44b, and an output function 44c. For example, the processing circuitry 44 functions as the control function 44a by reading out, from the memory 41, and executing a computer program corresponding to the control function 44a. Similarly, the processing circuitry 44 also functions as the identification function 44b and the output function 44c. The control function 44a is an example of a control unit. The identification function 44b is an example of an identification unit.

For example, the control function 44a controls operations of the gantry 10 and the bed 30 in accordance with an instruction from the user received via the input interface 43, and performs a CT scan on the subject P.

For example, the control function 44a supplies a high voltage to the X-ray tube 11 by controlling the X-ray high voltage device 14. Due to this, the X-ray tube 11 generates X-rays to be applied to the subject P. The control function 44a causes the subject P to move into a photographing port of the gantry 10 by controlling the bed drive device 32. The control function 44a also controls distribution of X-rays to be applied to the subject P by adjusting a position of the wedge 16, and an opening degree and a position of the collimator 17.

The control function 44a also detects the X-rays emitted from the X-ray tube 11 by controlling the X-ray detector 12 and the DAS 18, and acquires detection data. Specifically, as illustrated in FIG. 1B, the X-ray detector 12 includes a plurality of detection elements 12A and a voltage supply device 12B. The detection elements 12A are each constituted of a semiconductor detector and an electrode. In this configuration, when the X-rays are incident on the semiconductor detector, electric charges are generated inside the semiconductor detector. By applying a voltage to the semiconductor detector from the voltage supply device 12B via the electrode, the electric charges generated inside the semiconductor detector can be acquired. The voltage supply device 12B is an example of a voltage supply unit.

That is, the detection element 12A is configured by combining the semiconductor detector with the electrode, and the detection elements 12A are configured by attaching a plurality of the electrodes to the semiconductor detector. The control function 44a then causes each of the detection elements 12A to output the electric charge by controlling an operation of the voltage supply device 12B and supplying a voltage to the detection elements 12A. The control function 44a also controls an operation of the DAS 18, and acquires detection data based on the electric charges output from the detection elements 12A.

The control function 44a can also perform various kinds of processing based on the detection data acquired by the CT scan. For example, the control function 44a performs preprocessing such as logarithm conversion processing, offset correction processing, sensitivity correction processing between channels, beam hardening correction, scattered ray correction, and dark count correction on the detection data output from the DAS 18. The detection data after being subjected to the preprocessing is also referred to as raw data. The detection data before being subjected to the preprocessing and the raw data after being subjected to the preprocessing are collectively referred to as projection data. Furthermore, the control function 44a generates an X-ray CT image by performing reconstruction processing on the projection data using a filtered back projection method, a successive approximation reconstruction method, and the like. Various kinds of data such as the projection data and the X-ray CT image are stored in the memory 41 as appropriate.

The identification function 44b also identifies a target element from among the detection elements 12A based on the information acquired in advance, the target element causing a large current to flow through a circuit between the target element and the voltage supply device 12B. The control function 44a also compensates for a change of the voltage supplied from the voltage supply device 12B to the target element. Details about the processing performed by the control function 44a and the identification function 44b will be described later.

The output function 44c controls outputs of various kinds of data. For example, the output function 44c controls display on the display 42. For example, based on an input operation received from the user via the input interface 43, the output function 44c converts the X-ray CT image into an image for display such as an optional sectional image or a rendering image along an optional viewpoint direction to be displayed on the display 42. Additionally, for example, the output function 44c transmits various kinds of data such as the projection data and the X-ray CT image to an external image storage device to be stored therein.

In the X-ray CT apparatus 1 illustrated in FIG. 1A, processing functions are stored in the memory 41 in a form of a computer-executable computer program. The processing circuitry 44 is a processor that implements a function corresponding to each computer program by reading out, from the memory 41, and executing the computer program. In other words, the processing circuitry 44 that has read out the computer program has the function corresponding to the read-out computer program.

In FIG. 1A, it is assumed that the control function 44a, the identification function 44b, and the output function 44c are implemented by the single processing circuitry 44. Alternatively, the processing circuitry 44 may be configured by combining a plurality of independent processors, and the functions may be implemented when the respective processors execute the computer programs. The processing functions of the processing circuitry 44 may be implemented by being appropriately distributed or integrated into a single processing circuit or a plurality of processing circuits.

The processing circuitry 44 may implement the function by using a processor of an external device connected thereto via a network NW. For example, the processing circuitry 44 implements the functions illustrated in FIG. 1A by reading out, from the memory 41, and executing the computer programs corresponding to the respective functions, and using, as a calculation resource, a server group (cloud) connected to the X-ray CT apparatus 1 via the network NW.

In the above description, it is assumed that the single memory stores the computer programs corresponding to the respective processing functions of the processing circuit. However, the embodiment is not limited thereto. For example, a plurality of memories may be disposed in a distributed manner, and the processing circuit may be configured to read out a corresponding computer program from an individual memory. Instead of storing the computer program in the memory, the computer program may be directly incorporated in a circuit of the processor. In this case, the processor reads out and executes the computer program incorporated in the circuit to implement the function.

The configuration example of the X-ray CT apparatus 1 has been described above. With this configuration, the X-ray CT apparatus 1 can maintain a voltage used for acquiring the electric charges in the CT scan using the X-ray detector 12 of photon counting type.

Figure 2:
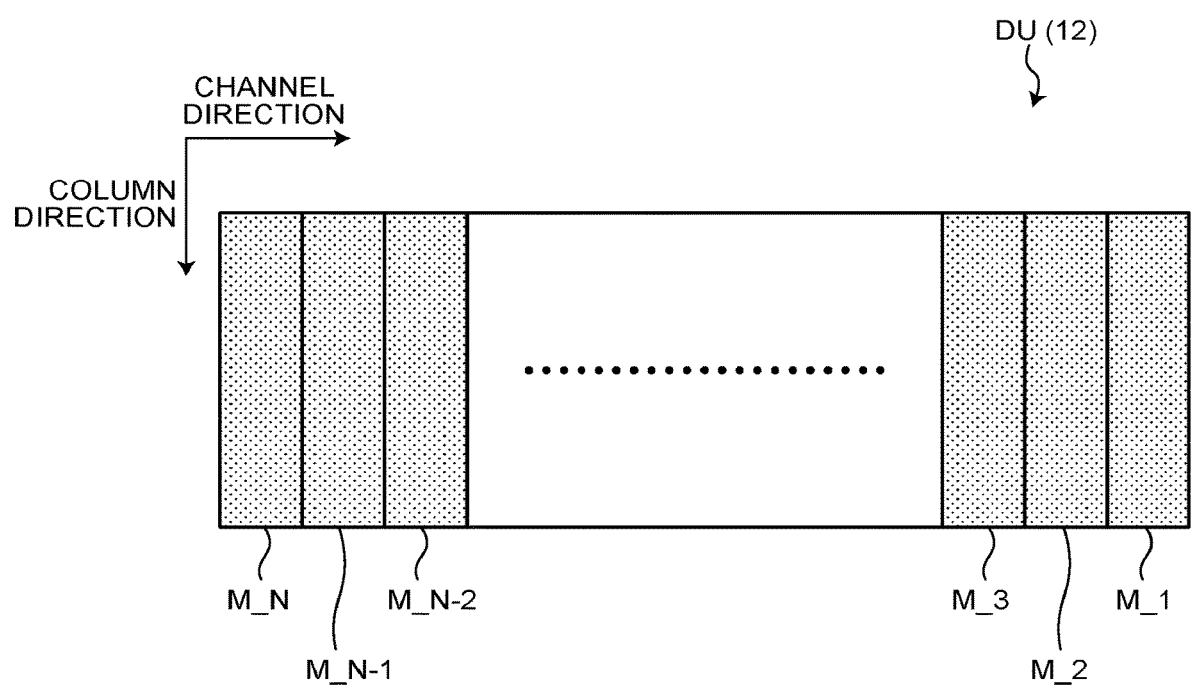
FIG. 2 is a diagram illustrating an example of the configuration of the X-ray detector according to the embodiment.
Figure 3:
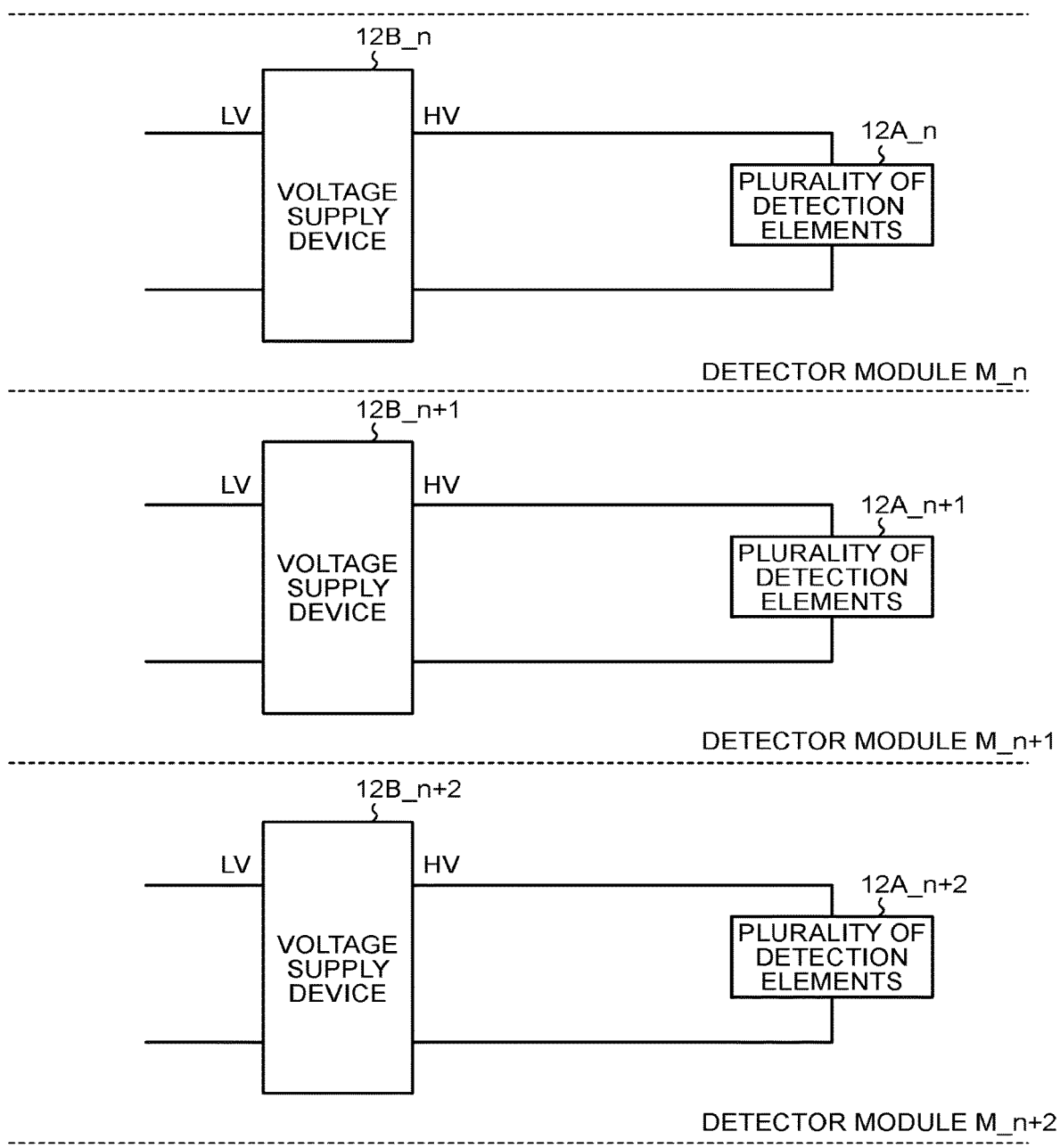
FIG. 3 is a diagram illustrating an example of the configuration of the X-ray detector according to the embodiment.

First, with reference to FIG. 2 and FIG. 3, the following describes a specific configuration example of the X-ray detector 12. FIG. 2 and FIG. 3 are diagrams illustrating an example of the configuration of the X-ray detector 12 according to the embodiment. The present embodiment describes an example in which the X-ray detector 12 and the DAS 18 are formed as the integrated detector unit DU.

FIG. 2 is a diagram illustrating the detector unit DU (X-ray detector 12) viewed from an X-ray incident direction. The detector unit DU illustrated in FIG. 2 is configured by arranging N detector modules M (detector modules M_1 to M_N) side by side in a channel direction (channel direction).

The one detector module M includes a plurality of the detection elements A (detection element group). For example, as illustrated in FIG. 3, a detector module M_n, which is the n-th detector module M among the N detector modules M, includes a plurality of detection elements 12A_n. Similarly, a detector module M_n+1 includes a plurality of detection elements 12A_n+1. Similarly, a detector module M_n+2 includes a plurality of detection elements 12A_n+2.

FIG. 3 illustrates an example in which the one voltage supply device 12B is connected to each detection element group. For example, a voltage supply device 12B_n is connected to the detection elements 12A_n included in the detector module M_n. A voltage supply device 12B_n+1 is connected to the detection elements 12A_n+1 included in the detector module M_n+1. A voltage supply device 12B_n+2 is connected to the detection elements 12A_n+2 included in the detector module M_n+2.

The voltage supply device 12B applies a voltage (bias voltage) to the detection elements A. The voltage supply device 12B is, for example, a transformer (transformer) that boosts a low voltage (LV) supplied from a voltage power supply device (not illustrated) to a high voltage (HV), and supplies the boosted high voltage (HV) to the detection elements A.

A specific value of the voltage supplied from the voltage supply device 12B to the detection elements A is not particularly limited, but a high voltage may be applied in some cases depending on the configuration of the X-ray detector 12. For example, the semiconductor detector included in the X-ray detector 12 is implemented by CdTe or CdTeZn (CZT), a high voltage of about kV order is supplied to the detection elements A. For example, the semiconductor detector included in the X-ray detector 12 is implemented by Si, a high voltage of several kV equivalent to or higher than that for CdTe or CdTeZn is supplied to the detection elements A.

While the CT scan is performed, the control function 44a causes the voltage supply device 12B to supply a voltage to the detection elements 12A to cause the electric charges accumulated in the detection elements 12A to be output for each detector module M. Due to this, the control function 44a can acquire the electric charges accumulated in the detection elements 12A as detection signals.

Herein, the voltage used for acquiring the electric charges may drop in some cases corresponding to a dose of X-rays applied to the detection elements 12A. Specifically, in a case in which the dose of X-rays to be applied is large, a large number of electric charges may be generated in the detection elements 12A, and the voltage applied to the detection elements 12A may drop in some cases because a large current flows in the circuit at the time of acquiring the electric charges.

Such a voltage drop may be caused only in some of the detection elements 12A due to imbalance of the dose of X-rays. At this point, an artifact may be generated in a pixel corresponding to the detection element 12A in which a voltage drop is caused in the projection data acquired by the CT scan, and a fault of the X-ray detector 12 may be broken down in some cases. For example, in a case in which a voltage drop is caused in only some of the detector modules M, the X-ray detector 12 may be broken down in some cases because a potential difference is caused between itself and the adjacent detector module M and an electric discharge is caused. Specifically, an electric discharge is easily caused in a case in which an interval to the adjacent detector module M is short, and the X-ray detector 12 is often broken down in a case of using a high voltage for acquiring the electric charges.

As one means for preventing a voltage drop, it can be considered that the voltage supply device 12B is designed to be compatible with a large current. For example, an upper limit value of a current that flows in the circuit is a value of a current that flows at the time when a maximum dose of X-rays that can be applied from the X-ray tube 11 is incident on the detection element 12A in a state of not being attenuated by the subject P and the like, and the upper limit value can be estimated. It can be considered that the voltage supply device 12B is designed to be compatible with the estimated upper limit value of the current. However, it is difficult to simply design the voltage supply device 12B to be compatible with a large current in view of implementation due to limitations on a size or cost.

Thus, the X-ray CT apparatus 1 according to the embodiment maintains a voltage used for acquiring the electric charges through processing performed by the processing circuitry 44 described below in detail. Specifically, based on the information acquired in advance, the identification function 44b identifies a target element from among the detection elements 12A included in the X-ray detector 12, the target element causing a large current to flow through a circuit between the target element and the voltage supply device 12B. The control function 44a then compensates for a change of the voltage supplied from the voltage supply device 12B to the target element.

First, the following describes identification of the target element by the identification function 44b. Examples of the information acquired in advance that is used for identifying the target element by the identification function 44b include an image acquired for the subject P, a photographing condition, and subject information.

For example, in the CT scan for the subject P, a positioning scan is previously performed in some cases. Specifically, after the subject P is placed on the tabletop 33, the positioning scan is performed first, a photographing range is set based on a positioning image acquired by the positioning scan, and the CT scan (main scan) for acquiring an image for diagnosis is performed for the set photographing range. The positioning image is also called a scanogram (scano-image), a scout image, or the like. The identification function 44b can identify the target element causing a large current to flow through a circuit between the target element and the voltage supply device 12B based on the positioning image acquired by the positioning scan.

Specifically, the identification function 44b can estimate the detection element 12A on which a large dose of X-rays is incident for each irradiation angle (view) of the X-ray based on the positioning image. For example, based on the positioning image, the identification function 44b can estimate a range in which the subject P is present in a photographing space, and estimate the detection element 12A on which the X-ray is incident without being transmitted through the subject P. The identification function 44b can also estimate the detection element 12A on which the X-ray is incident, the X-ray that has been transmitted through the subject P but is not almost attenuated due to a path length of the subject P present on an X-ray path, a substance, and the like. A large current flows through the circuit between the detection element 12A on which a large dose of X-rays is incident and the voltage supply device 12B, so that the identification function 44b can identify, as the target element, the detection element 12A on which a large dose of X-rays is incident.

As another example, the identification function 44b can estimate the detection element 12A on which a large dose of X-rays is incident for each view based on an optical image obtained by photographing the subject P. Such an optical image is acquired for the subject P placed on the tabletop 33 as a target by an optical camera (not illustrated). The identification function 44b can estimate a range in which the subject P is present in a photographing space based on the optical image, and estimate the detection element 12A on which the X-ray is incident without being transmitted through the subject P. The identification function 44b can also estimate the detection element 12A on which the X-ray is incident, the X-ray that has been transmitted through the subject P but is not almost attenuated due to the path length of the subject P present on the X-ray path.

As another example, the identification function 44b can estimate the detection element 12A on which a large dose of X-rays is incident for each view based on the photographing condition. The identification function 44b can automatically acquire the photographing condition for the subject P from a system such as a Hospital Information System (HIS) or a Radiology Information System (RIS). Alternatively, the identification function 44b can acquire the photographing condition for the subject P by receiving an input operation from the user such as a doctor via the input interface 43.

For example, at the time of setting the photographing condition, a photographing range corresponding to a part to be inspected of the subject P is set. Herein, a shape of the part to be inspected can be approximately estimated although there are individual differences among subjects P. For example, the part to be inspected is an upper half of a body, X-rays are applied to a head, a neck, and a chest in order. Herein, in a cross section perpendicular to a body axis direction (Z-direction), the head has an elliptical shape placed on the tabletop 33, the neck has an elliptical shape smaller than the head, and the chest has an elliptical shape larger than the head. Based on such knowledge, the identification function 44b can estimate the detection element 12A on which the X-ray is incident without being transmitted through the subject P based on the photographing condition including the part to be inspected.

As another example, the identification function 44b can estimate the detection element 12A on which a large dose of X-rays is incident for each view based on subject information. For example, a shape of the subject P in a cross section perpendicular to the body axis direction is approximately an elliptical shape disposed on the tabletop 33. A size of the elliptical shape varies corresponding to a physical constitution (a body weight, a body mass index (BMI), and the like) of the subject P. Based on such knowledge, the identification function 44b can estimate the detection element 12A on which the X-ray is incident without being transmitted through the subject P based on the subject information including a height, a body weight, and the like. The identification function 44b may automatically acquire the subject information from a system such as an HIS or an RIS, or may automatically acquire the subject information based on an input operation from the user.

As another example, the identification function 44b can estimate the detection element 12A on which a large dose of X-rays is incident for each view based on photographing information and subject information. For example, the identification function 44b deforms a shape model indicating a typical shape of a human body based on the subject information including a height, a body weight, and the like. The identification function 44b identifies a portion of the shape model after deformation in accordance with a photographing range. By virtually disposing the portion of the shape model after deformation that is identified in accordance with the photographing range on the tabletop 33, the identification function 44b can estimate a range in which the subject P is present in the photographing space, and estimate the detection element 12A on which the X-ray is incident without being transmitted through the subject P. The identification function 44b can also estimate the detection element 12A on which the X-ray is incident, the X-ray that has been transmitted through the subject P but is not almost attenuated due to the path length of the subject P present on the X-ray path.

The control function 44a then compensates for a change of the voltage supplied from the voltage supply device 12B to the target element identified by the identification function 44b. For example, the control function 44a compensates for a change of the voltage supplied from the voltage supply devices 12B to the target element by changing the number of the voltage supply devices 12B connected to the target element. This point is described below with reference to FIG. 4.

Figure 4:
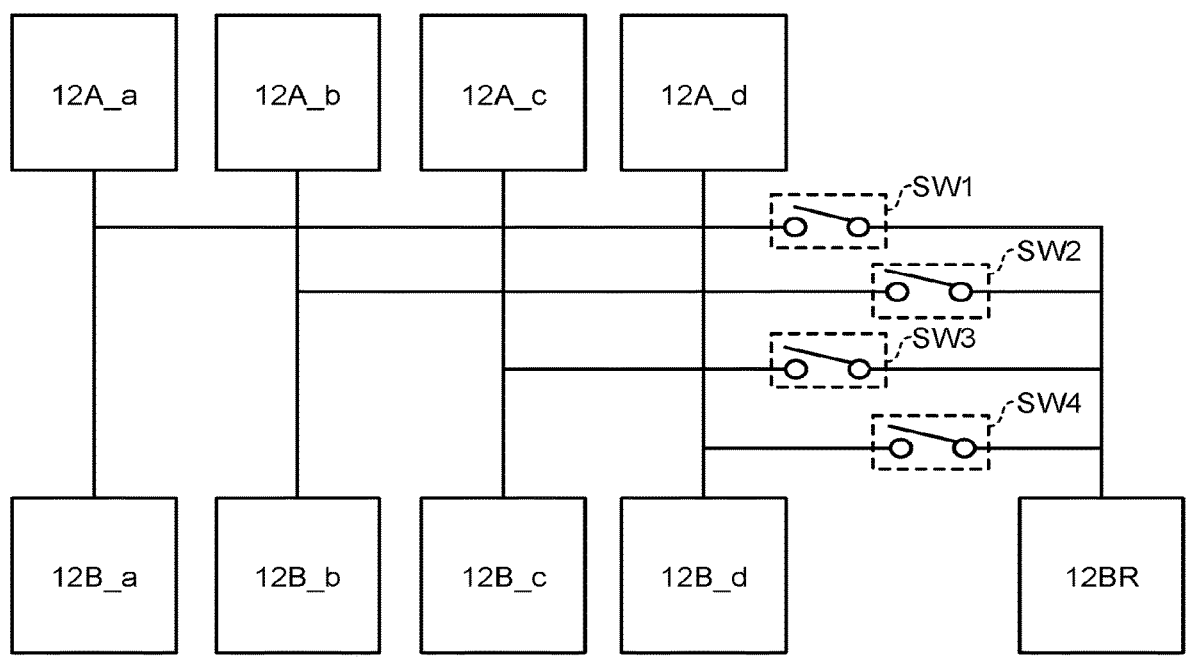
FIG. 4 is a diagram illustrating an example of a method for compensating for a change of a voltage according to the embodiment.

In FIG. 4, a voltage supply device 12B_a is connected to a plurality of detection elements 12A_a, a voltage supply device 12B_b is connected to a plurality of detection elements 12A_b, a voltage supply device 12B_c is connected to a plurality of detection elements 12A_c, and a voltage supply device 12B_d is connected to a plurality of detection elements 12A_d. The detection elements 12A_a are a detection element group included in any one of the N detector modules M illustrated in FIG. 2. Similarly, the detection elements 12A_b, the detection elements 12A_c, and the detection elements 12A_d are each a detection element group included in any one of the detector modules M. Each of the voltage supply device 12B_a, the voltage supply device 12B_b, the voltage supply device 12B_c, and the voltage supply device 12B_d is an example of a first supply unit disposed for each detection element group.

Furthermore, in the example illustrated in FIG. 4, a voltage supply device 12BR is disposed. Connection between the detection elements 12A_a and the voltage supply device 12BR can be switched on/off by a switch SW1. Connection between the detection elements 12A_b and the voltage supply device 12BR can be switched on/off by a switch SW2. Connection between the detection elements 12A_c and the voltage supply device 12BR can be switched on/off by a switch SW3. Connection between the detection elements 12A_d and the voltage supply device 12BR can be switched on/off by a switch SW4. The voltage supply device 12BR is an example of a second supply unit that can switch connection with the detection elements 12A_a, the detection elements 12A_b, the detection elements 12A_c, and the detection elements 12A_d.

By way of example, the following describes a case in which some or all of the detection elements 12A_a are identified as target elements. In this case, the identification function 44b identifies a detector module M_a including the target elements as a target module, and the control function 44a compensates for a change of the voltage supplied to the detection elements 12A_a included in the target module.

Specifically, the control function 44a connects the voltage supply device 12BR to the detection elements 12A_a by turning on the switch SW1 and turning off the switch SW2, the switch SW3, and the switch SW4. Due to this, a voltage is supplied to the detection elements 12A_a from two voltage supply devices 12B (the voltage supply device 12B_a and the voltage supply device 12BR), so that a large current can be handled. That is, even in a case in which a large dose of X-rays is incident on some or all of the detection elements 12A_a and a large current flows through the circuit, the two voltage supply devices 12B can supply sufficient electric charges to electrodes included in the detection elements 12A_a, and suppress a voltage drop.

As described above, the target element can be identified for each view. That is, a dose of X-rays incident on each detection element A varies in accordance with an irradiation angle at all times, so that there may be a case in which the detection elements 12A_a correspond to the target elements in a certain view and the detection elements 12A_a do not correspond to the target elements in another view. In such a case, the control function 44a may change the number of the voltage supply devices 12B connected to the detection elements 12A_a only in a view in which the detection elements 12A_a correspond to the target elements, or in all views.

In the description about FIG. 4, exemplified is a case of changing the number of the voltage supply devices 12B connected to the target elements by disposing the voltage supply device 12BR that can switch connection to the detection element groups. However, the embodiment is not limited thereto. The following describes another example for changing the number of the voltage supply devices 12B connected to the target elements with reference to FIG. 5.

Figure 5:
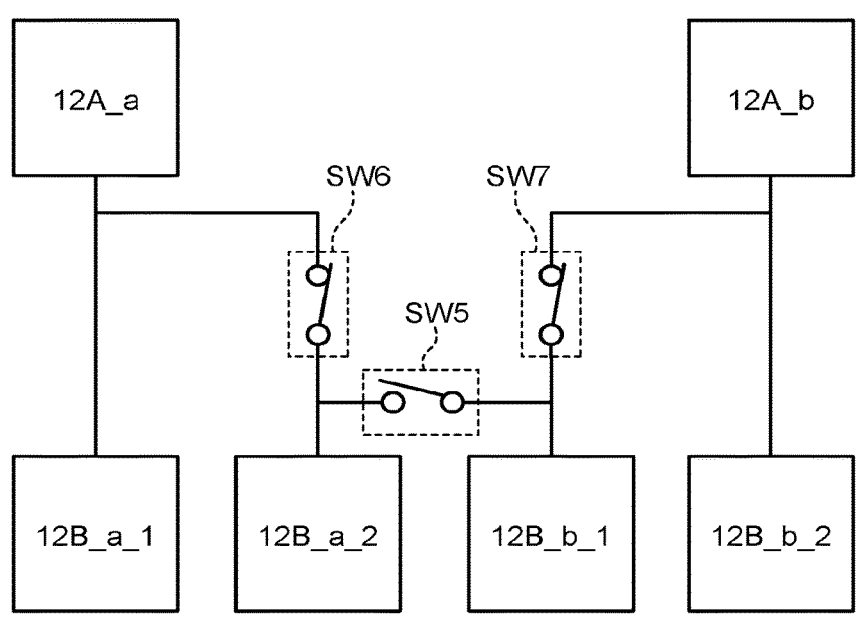
FIG. 5 is a diagram illustrating an example of a method for compensating a change of a voltage according to the embodiment.

In FIG. 5, two voltage supply devices 12B (a voltage supply device 12B_a_1 and a voltage supply device 12B_a_2) are connected to the detection elements 12A_a included in the detector module M_a. Additionally, two voltage supply devices 12B (a voltage supply device 12B_b_1 and a voltage supply device 12B_b_2) are connected to the detection elements 12A_b included in a detector module M_b. That is, in FIG. 5, a plurality of the voltage supply devices 12B are disposed for each detection element group.

Herein, a connection destination of the voltage supply device 12B_a_2 illustrated in FIG. 5 can be changed from the detection elements 12A_a to the detection elements 12A_b. Specifically, the voltage supply device 12B_a_2 can be connected to the detection elements 12A_b by turning on a switch SW5 and a switch SW7, and turning off a switch SW6. Similarly, a connection destination of the voltage supply device 12B_b_1 can be changed to the detection elements 12A_a.

By way of example, the following describes a case in which some or all of the detection elements 12A_a are identified as target elements. In this case, the identification function 44b identifies a detector module M_a including the target elements as a target module, and the control function 44a compensates for a change of the voltage supplied to the detection elements 12A_a included in the target module.

Specifically, the control function 44a connects the voltage supply device 12B_b_1 to the detection elements 12A_a by turning on the switch SW5 and the switch SW6, and turning off the switch SW7. Due to this, a voltage is supplied to the detection elements 12A_a from three voltage supply devices 12B (the voltage supply device 12B_a_1, the voltage supply device 12B_a_2, and the voltage supply device 12B_b_1), so that a large current can be handled. That is, even in a case in which a large dose of X-rays is incident on some or all of the detection elements 12A_a and a large current flows through the circuit, the three voltage supply devices 12B can supply sufficient electric charges to the electrodes included in the detection elements 12A_a, and suppress a voltage drop.

In a case of connecting the voltage supply device 12B_b_1 to the detection elements 12A_a, the number of the voltage supply devices 12B connected to the detection elements 12A_b is reduced, and a voltage drop can be easily caused. Thus, the control function 44a may select the detection elements 12A_b from positions where a large dose of X-rays is hardly incident. For example, X-rays incident on the detector module M on an outer peripheral side (for example, the detector module M_1, the detector module M_N, and the like illustrated in FIG. 2) are significantly attenuated by the wedge 16, or blocked by the collimator 17 in many cases. That is, a large dose of X-rays is hardly incident on the detector module M on the outer peripheral side, so that the control function 44a may select the detection element group included in the detector module M on the outer peripheral side as the detection elements 12A_b, and perform the processing described above thereon.

Also in FIG. 5, similarly to the case in FIG. 4, the control function 44a may change the number of the voltage supply devices 12B connected to the detection elements 12A_a only in a view in which the detection elements 12A_a correspond to the target elements, or in all views.

As described above, the X-ray CT apparatus 1 according to the embodiment includes the X-ray detector 12 as a photon counting type X-ray detector, the control function 44a, and the identification function 44b. The X-ray detector 12 includes the detection elements 12A and the voltage supply device 12B. The voltage supply device 12B supplies the detection elements A with a voltage for reading out the electric charges accumulated in the detection elements A irradiated with X-rays. The identification function 44b identifies the target element from among the detection elements 12A based on the information acquired in advance, the target element causing a large current to flow through a circuit between the target element and the voltage supply device 12B. The control function 44a compensates for a change of the voltage supplied from the voltage supply device 12B to the target element. Due to this, the X-ray CT apparatus 1 according to the embodiment can maintain the voltage used for acquiring the electric charges in the CT scan using the photon counting type X-ray detector.

A size and cost of the X-ray CT apparatus 1 according to the embodiment can be reduced as compared with a case of disposing the voltage supply device 12B compatible with a large current on each detection module, for example, and implementation thereof is relatively easy.

A dose of X-rays incident on the detection elements 12A of the X-ray detector 12 varies depending on the photographing condition or the subject P, and also varies depending on an irradiation direction of the X-rays. That is, which of the detection elements 12A receives incidence of a large dose of X-rays that can cause an electric discharge is different for each CT scan. On the other hand, the X-ray CT apparatus 1 according to the embodiment identifies the target element from among the detection elements 12A based on the information acquired in advance, the target element causing a large current to flow through a circuit between the target element and the voltage supply device 12B, and compensates for a change of the voltage supplied from the voltage supply device 12B to the target element. That is, the X-ray CT apparatus 1 according to the embodiment can optimize control for maintaining the voltage used for acquiring electric charges for each CT scan.

In the embodiment described above, exemplified is a case of compensating for a change of the voltage supplied from the voltage supply device 12B to the target element by changing the number of the voltage supply devices 12B connected to the target element. However, the embodiment is not limited thereto. For example, the control function 44a may compensate for a change of the voltage supplied from the voltage supply device 12B to the target element by changing electric power supplied from the voltage supply device 12B to the target element.

In the embodiment described above, exemplified is a case in which the X-ray detector 12 and the DAS 18 are formed as the integrated detector unit DU. However, the embodiment is not limited thereto, and can be similarly applied to the X-ray detector 12 as a single item.

In the embodiment described above, the detection elements 12A included in one detector module M is described as the detection element group of one unit, but the embodiment is not limited thereto. For example, each of the detection element groups (the detection elements 12A_a, the detection elements 12A_b, the detection elements 12A_c, and the detection elements 12A_d) illustrated in FIG. 4 and FIG. 5 may be a detection element group included in one detector module M, or may be a detection element group grouped in an optional unit.

In the embodiment described above, exemplified is a case of identifying the target element from among the detection elements 12A based on the information acquired in advance, the target element causing a large current to flow through a circuit between the target element and the voltage supply device 12B. However, the embodiment is not limited thereto, and the target element may be identified based on information that is acquired during a CT scan. For example, a sensor that can measure the voltage applied to the detection element 12A may be disposed on the X-ray detector 12, and the identification function 44b may identify the target element by comparing a measured voltage with a specified value. The sensor preferably has high accuracy and high responsiveness.

In a case of identifying the target element based on the information that is acquired during the CT scan, the processing performed by the control function 44a and the identification function 44b described above may be performed by the X-ray detector 12. That is, functions corresponding to the control function 44a and the identification function 44b described above may be implemented by a processing circuit included in the X-ray detector 12. For example, the processing circuit included in the X-ray detector 12 identifies the target element from among the detection elements 12A based on the information that is acquired during the CT scan, the target element causing a large current to flow through a circuit between the target element and the voltage supply device 12B, and compensates for a change of the voltage supplied from the voltage supply device 12B to the target element.

The word of "processor" used in the above description means, for example, a circuit such as a CPU, a Graphics Processing Unit (GPU), an ASIC, and a programmable logic device (for example, a simple programmable logic device (SPLD), a complex programmable logic device (CPLD), and a field programmable gate array (FPGA)). In a case in which the processor is a CPU, for example, the processor implements a function by reading out and executing a computer program stored in a storage circuit. On the other hand, in a case in which the processor is an ASIC, for example, the function is directly incorporated as a logic circuit in the circuit of the processor instead of storing the computer program in the storage unit. Each of processors in the embodiment is not necessarily configured as a single circuit. A plurality of independent circuits may be combined to be one processor to implement the function thereof. Furthermore, a plurality of constituent elements in the respective drawings may be integrated into one processor to implement the function thereof.

The constituent elements of the devices according to the embodiment described above are merely conceptual, and it is not required that they are physically configured as illustrated necessarily. That is, specific forms of distribution and integration of the devices are not limited to those illustrated in the drawings. All or part thereof may be functionally or physically distributed/integrated in arbitrary units depending on various loads or usage states. Furthermore, all or optional part of the processing functions performed by the respective devices may be implemented by a CPU and a computer program analyzed and executed by the CPU, or may be implemented as hardware using wired logic.

The control method for the photon counting type X-ray detector described above in the embodiment can be implemented by executing a computer program prepared in advance by a computer such as a personal computer or a workstation. This computer program can be distributed via a network such as the Internet. This computer program may be recorded in a computer-readable non-transitory recording medium such as a hard disk, a flexible disk (FD), a CD-ROM, an MO, or a DVD, and executed by being read out from the recording medium by the computer.

According to the at least one embodiment described above, the voltage used for acquiring electric charges can be maintained in the CT scan using the photon counting type X-ray detector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray CT apparatus comprising:
    an X-ray detector of photon counting type including a plurality of detection elements and a voltage supply device configured to supply the detection elements with a voltage for reading out electric charges accumulated in the detection elements irradiated with X-rays; and
    processing circuitry configured to identify a target element from among the detection elements based on information acquired in advance, the target element causing a large current to flow through a circuit between the target element and the voltage supply device and compensate for a change of the voltage supplied from the voltage supply device to the target element.

2. The X-ray CT apparatus according to claim 1, wherein the processing circuitry compensates for a change of the voltage supplied from the voltage supply device to the target element by changing the number of the voltage supply devices connected to the target element.

3. The X-ray CT apparatus according to claim 2, wherein
    the X-ray detector includes a plurality of detection element groups including the detection elements, and includes, as the voltage supply devices, at least one first supply unit disposed for each of the detection element groups and a second supply unit configured to be able to switch connection to the detection element groups; and
    the processing circuitry changes the number of the voltage supply devices connected to the target element by connecting the second supply unit to the detection element group including the target element, and compensates for a change of the voltage supplied from the voltage supply device to the target element.

4. The X-ray CT apparatus according to claim 2, wherein
    the X-ray detector includes a plurality of detection element groups including the detection elements and a plurality of the voltage supply devices for each of the detection element groups, and
    the processing circuitry changes the number of the voltage supply devices connected to the target element by connecting some of the voltage supply devices that have been connected to the detection element groups not including the target element to the detection element group including the target element, and compensates for a change of the voltage supplied from the voltage supply device to the target element.

5. The X-ray CT apparatus according to claim 1, wherein the processing circuitry:
    identifies, based on a positioning image acquired by positioning scan, the target element causing a large current to flow through a circuit between the target element and the voltage supply device, in a CT scan that is performed after the positioning scan; and
    compensates for a change of the voltage supplied from the voltage supply device to the target element in the CT scan.

6. The X-ray CT apparatus according to claim 1, wherein the processing circuitry identifies a target element from among the detection elements based on an optical image obtained by photographing a subject with an optical camera, the target element causing a large current to flow through a circuit between the target element and the voltage supply device.

7. The X-ray CT apparatus according to claim 1, wherein the processing circuitry identifies a target element from among the detection elements based on a photographing condition, the target element causing a large current to flow through a circuit between the target element and the voltage supply device.

8. The X-ray CT apparatus according to claim 1, wherein the processing circuitry identifies a target element from among the detection elements based on subject information, the target element causing a large current to flow through a circuit between the target element and the voltage supply device.

9. The X-ray CT apparatus according to claim 1, wherein
the X-ray detector is configured by arranging a plurality of detector modules each including the detection elements,
the voltage supply device supplies each of the detector modules with a voltage for reading out the electric charges, and
the processing circuitry identifies a target module including the target element and compensates for a change of a voltage supplied from the voltage supply device to the detection elements included in the target module.

10. The X-ray CT apparatus according to claim 1, wherein the processing circuitry compensates for a change of a voltage supplied from the voltage supply device to the target element by changing electric power supplied from the voltage supply device to the target element.

11. An X-ray detector of photon counting type comprising a plurality of detection elements and a voltage supply device configured to supply the detection elements with a voltage for reading out electric charges accumulated in the detection elements irradiated with X-rays, wherein
the X-ray detector is capable of changing the number of the voltage supply devices connected to a target element among the detection elements, the target element causing a large current to flow through a circuit between the target element and the voltage supply device.

12. A control method for the X-ray detector of photon counting type including a plurality of detection elements and a voltage supply device configured to supply the detection elements with a voltage for reading out electric charges accumulated in the detection elements irradiated with X-rays, the control method comprising:
identifying a target element from among the detection elements based on information acquired in advance, the target element causing a large current to flow through a circuit between the target element and the voltage supply device; and
compensating for a change of the voltage supplied from the voltage supply device to the target element.

* * * * *